UNITED STATES PATENT OFFICE.

ANTONIO PELLETIER, OF WASHINGTON, DISTRICT OF COLUMBIA.

IMPROVED CEMENT FOR COATING WOOD, &c.

Specification forming part of Letters Patent No. 76,806, dated April 14, 1868.

*To all whom it may concern:*

Be it known that I, ANTONIO PELLETIER, of Washington, in the county of Washington, District of Columbia, have invented certain new and useful Improvements in Cements for "Coating Wood for Roofing," &c.; and I do hereby declare that the following is a full, clear, and exact description thereof, reference being had to the accompanying drawings making part of this specification and to the letters of reference marked thereon, like letters indicating like parts wherever they occur.

To enable others skilled in the art to construct and use my invention, I will proceed to describe it.

My invention relates to improvements in the composition of cement and roofing material for which Letters Patent were granted me, Nos. 63,087, 71,210, 73,643, and 74,587, and consists, principally, in the addition of new material for making a completely fire and water proof composition. While the mass for which Letters Patent were formerly issued to me answers most purposes there described and set forth, I have found by further experiments that it could be materially improved. My composition, as now used and treated with my improvement, makes a very superior and completely fire and water proof coating for wood and other perishable materials.

In preparing my material I use, first, paper-pulp, or any other finely-divided form of woody fiber, such as saw-dust, tree-moss, sea-grass, straw, &c.; second, sand or its equivalent, pulverized sandstone, silicious limestone, or similar rocks, with or without the addition of caustic or carbonate of lime, gas-house lime, or equivalent forms of lime; third, oxide of zinc or its equivalent, roasted zinc ores, or, instead of it, oxide of iron and manganese, or their ores in a pulverized state; fourth, hydraulic cement, or Portland cement, or, in its place, material which, upon heating, gives rise to its formation, namely, sulphate of alumina, or other cheap salts of alumina or aluminous materials, such as feldspar, granite, furnace-slags, &c., together with oyster-shell or other gas-house lime, dolomite limestone. The pulverized ingredients named under the above four heads are then well mixed with chloride of zinc solution, (or chloride of iron, or chloride of manganese, when the oxides of iron and manganese are substituted for oxide of zinc.) The whole is thoroughly worked, by means of machinery, until a highly-plastic mass is obtained. The composition now will not only firmly adhere to wood or other perishable materials, but render them perfectly fire and water proof. The wood underneath will, owing to the highly antiseptic properties of the chloride of zinc, be longer preserved than without the coat. This plastic mass will dry rapidly and in ten hours become as hard as rock. To embellish and perhaps otherwise improve the roofing composition, it may be finely coated with silicate of soda or potash by means of a paint-brush.

The following example will illustrate the proportions I employ in preparing my cement: I use fifty parts, by weight, of woody fiber; thirty-five parts, by weight, of sand; ten parts, by weight, of oxide of zinc or roasted zinc ores; five parts, by weight, of Portland cement; two and one-half parts, by weight, of Portland cement; and two and one-half parts, by weight, of soap-stone, or material furnishing hydraulic cement when heated. The mass is then well stirred and worked with chloride of zinc. The chloride of zinc, specific gravity 1.5 to 1.6, must be in proportion to the oxide of zinc. I prefer, for three parts, by weight, of oxide of zinc, fifty parts, by weight, of chloride of zinc solution, (one pint weighs one and one-half pound,) fifty-five parts, by weight, of oxide of zinc, twenty parts, by weight, of dry chloride of zinc. The dry chloride is next dissolved in rain-water until it has the proper specific gravity, 1.5 to 1.6. The composition, after being applied to a roof, and being of proper dryness, may yet be improved and embellished by applying externally a coat of silicate of soda by means of a painter's brush. The composition adheres well to all kinds of wood, but, if desirable for some purposes, I use a small admixture of glue dissolved in acetic or nitric acid.

Having thus described my invention, what I claim is—

1. The compound, consisting of vegetable fiber, sand or pulverized silicious limestone, caustic or carbonate of lime, Portland cement, oxide of zinc, chloride of zinc, without or with the additional use of silicate of soda, substantially as described and set forth.

2. I claim, as substitutes for oxide and chloride of zinc, equivalent metallic salts, substantially as described and set forth.

3. I claim, as substitutes for Portland cement, or hydraulic cement, the addition of aluminous salts, mineral, and slags, together with oyster-shells, gas-house lime, dolomite, or similar magnesian limestones, substantially as described and set forth.

4. I claim, as a new article of manufacture, the composition substantially as herein described, and for the purposes set forth.

ANTONIO PELLETIER.

Witnesses:
P. T. DODGE,
L. HAILEY.